(12) United States Patent
Juang et al.

(10) Patent No.: US 11,513,786 B2
(45) Date of Patent: Nov. 29, 2022

(54) METHOD AND SYSTEM FOR SERVER FIRMWARE UPDATE FRAMEWORK

(71) Applicant: QUANTA CLOUD TECHNOLOGY INC., Taipei (TW)

(72) Inventors: Jia Yu Juang, Taipei (TW); Chia Jui Lee, Taipei (TW); Tong Pai Huang, Taipei (TW)

(73) Assignee: QUANTA CLOUD TECHNOLOGY INC., Taipei (TW)

( * ) Notice: Subject to any disclaimer, the term of this patent is extended or adjusted under 35 U.S.C. 154(b) by 110 days.

(21) Appl. No.: 17/092,000

(22) Filed: Nov. 6, 2020

(65) Prior Publication Data
US 2022/0147335 A1 May 12, 2022

(51) Int. Cl.
*G06F 8/65* (2018.01)
*G06F 8/61* (2018.01)
*H04L 67/141* (2022.01)
*H04L 67/00* (2022.01)
*H04L 61/5014* (2022.01)

(52) U.S. Cl.
CPC .......... *G06F 8/65* (2013.01); *G06F 8/63* (2013.01); *H04L 67/141* (2013.01); *H04L 67/34* (2013.01); *H04L 61/5014* (2022.05)

(58) Field of Classification Search
CPC ... G06F 8/65; G06F 8/63; H04L 67/34; H04L 67/141
See application file for complete search history.

(56) References Cited

U.S. PATENT DOCUMENTS

| | | | | |
|---|---|---|---|---|
| 5,586,304 A * | 12/1996 | Stupek, Jr. | .............. | G06F 8/658 717/170 |
| 7,484,084 B1 * | 1/2009 | Ranaweera | ............. | G06F 8/656 713/1 |
| 8,171,174 B2 * | 5/2012 | Lambert | ............... | H04L 41/344 702/186 |
| 10,360,043 B2 * | 7/2019 | Wynn | .................... | G06F 9/4406 |
| 2012/0108207 A1 * | 5/2012 | Schell | .................. | H04W 8/205 455/411 |
| 2016/0202964 A1 * | 7/2016 | Butcher | ............... | G06F 9/4416 717/172 |
| 2017/0046152 A1 * | 2/2017 | Shih | .................... | G06F 11/0727 |
| 2017/0070590 A1 * | 3/2017 | Balakrishnan | .......... | G06F 3/067 |
| 2018/0173516 A1 * | 6/2018 | Tung | ........................ | G06F 8/65 |
| 2021/0392039 A1 * | 12/2021 | Atur | ........................ | H04L 67/34 |

* cited by examiner

*Primary Examiner* — Marina Lee
(74) *Attorney, Agent, or Firm* — Nixon Peabody LLP

(57) ABSTRACT

A system and method for providing commodity firmware packages for updating firmware in a network of servers is disclosed. A deployment server executes an update framework to provide firmware to target servers. A target server includes different hardware components and a baseboard management controller. Each of the hardware components have an associated firmware image. A management network connects the deployment server and the target server. A data network connects the deployment server and the target server. The deployment server sends a bootable disk image via virtual media redirection through the management network. The deployment server sends an upgrade framework to upload at least one firmware image associated with one of the hardware components through the data network to the remote server.

21 Claims, 10 Drawing Sheets

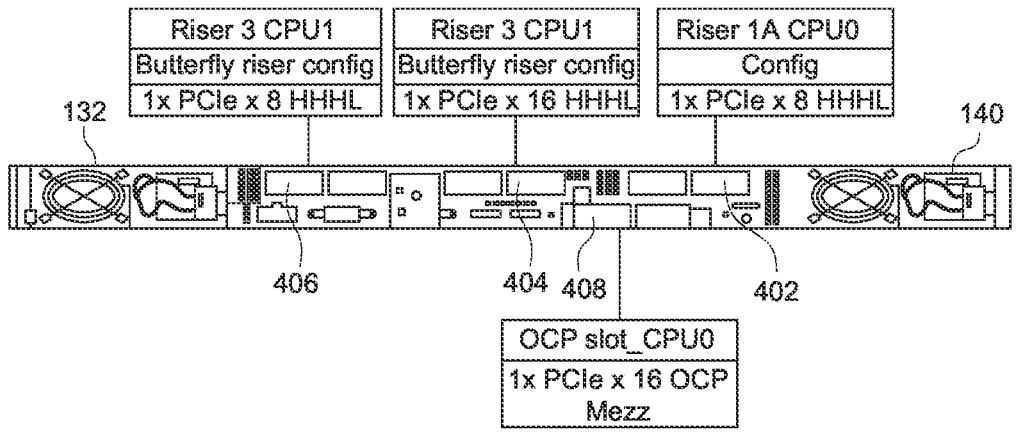

FIG. 4

```
{
    "@odata. context" : "/redfish/v1/$metadata",
    "@odata. etag" : "W/\"1586420080\"",
    "@odata. id" : "/redfish/v1/chassis/self/PCIeDevices/3/Functions/1",
    "@odata. type" : "#PCIeFunction.v1_1_0.PCIeFunction",
    "DeviceClass" : "NetworkController",
    "DeviceId" : "158b",
    "FunctionId" : "1",
    "Id" : "1",
    "Oem" : {
        "Quanta_Rackscale" : {
            "MACAddress" : "3C:FD:FE:A8:5F:1D",
            "PCIeBusNo" : "1c",
            "PCIeDevNo" : "0",
            "PortNumber" : "2",
            "slotNumber" : "RISER 1A SLOT(PCIe x8)"
        }
    },
    "SubsystemId" : "0000",
    "SubsystemVendorId" : "8086",
    "VendorId" : "8086"
}
```

FIG. 5

METHOD AND SYSTEM FOR SERVER FIRMWARE UPDATE FRAMEWORK

TECHNICAL FIELD

The present disclosure relates generally to firmware management for computing devices. More particularly, aspects of this disclosure relate to a system that provides a mechanism for updating firmware for all components of a target server in a rack.

BACKGROUND

Servers are employed in large numbers for high demand applications, such as network based systems or data centers. The emergence of the cloud for computing applications has increased the demand for data centers. Data centers have numerous servers that store data and run applications accessed by remotely connected, computer device users. A typical data center has physical chassis rack structures with attendant power and communication connections. Each rack may hold multiple computing servers and storage servers that are networked together.

The servers in a data center facilitate many services for businesses, including executing applications, providing virtualization services, and facilitating Internet commerce. Servers typically have a baseboard management controller (BMC) that manages internal operations and handles network communications with a central management station in a data center. Different networks may be used for exchanging data between servers and exchanging operational data on the operational status of the server through a management network.

As companies place more dependence on services from data center servers, uptime becomes more critical and valuable. When a server or servers are not available, productivity slows down or stops entirely, costing businesses profitability. Although a data center manager may take every precaution to prevent service from being interrupted from faults in the servers, the problem of server downtime is difficult to fully eliminate. One of the primary causes of server downtime is making upgrades to hardware or software/firmware. Server hardware components such as storage devices, network interface cards (NICs), disk controllers, and the like, perform functions according to firmware. Thus, firmware may be updated to improve the operation of such hardware components without having to replace them, but this requires some down time to update the firmware.

For data center administrators, one challenge is updating firmware for all server hardware components such as processors, NICs, storage cards, and controllers for a large number of servers. The component firmware for all hardware components in a server must be kept up to date for purposes such as bug fixes or applying new features.

Traditionally, the dynamic host configuration protocol (DHCP) and pre-boot execution environment (PXE) network environment is used by a deployment server for deploying a live operating system image to networked target servers via a data network. However, the problem with this approach is that only one DHCP service exists for the local area network (LAN) for such servers. Thus, if the single DHCP service is used for updates, another DHCP service cannot be established without interfering with existing DHCP service. An alternative approach is mounting the update images to the BMC of the server through virtual media redirection. The disadvantage of this approach is that the redirection process is time-consuming since the image size can be up to hundreds of megabytes, and the deployment server cannot trace the update status. Currently, there is no efficient method to deploy a firmware image to target servers without affecting the existing network environment.

The other challenge for data center administrators is the provision of the appropriate firmware update package for servers. There are many kinds of hardware components in a server, and each of them has its own, often distinct, firmware update mechanism. In general, operators need to prepare a firmware file and use a corresponding tool for updating the existing firmware with the firmware file. Vendors will often provide an update package. An update package typically contains an update tool and a firmware file to support various hardware components. The update tools, such as the Intel NVM Update Utility and the Intel SSD Data Center Tool, can find all supported hardware components and update their firmware. The type of the update tool is also diverse, such as a tool with one or more scripts, a single executable file, and an installer. However, this process is often performed manually for most hardware components, requiring tracking updates from vendors of each of the different hardware components.

Thus, there is a need for a system that facilitates firmware updates for a variety of hardware components in a remote server. Thus, there is a need for an image firmware loading process for a remote server without using an existing DHCP service of a data network. There is also a need for a unified structure for firmware update for all types of common hardware components over multiple remote servers.

SUMMARY

One disclosed example is a system that includes a deployment server that executes an update framework to provide firmware to target servers. A target server includes different hardware components and a baseboard management controller. Each of the hardware components has an associated firmware image. A management network connects the deployment server and the target server. A data network connects the deployment server and the target server. The deployment server sends a bootable disk image via virtual media redirection through the management network. The deployment server sends an upgrade framework to upload at least one firmware image associated with one of the hardware components through the data network to the remote server.

A further implementation of the example system is an embodiment where the baseboard management controller receives the virtual media redirection through the management network. Another implementation is where the hardware components include at least one of a processor, a BIOS, a network interface card (NIC), a FPGA, or a serial attached SCSI (SAS) storage controller. Another implementation is where firmware information for each of the hardware components of the target server is obtained. The deployment server obtains firmware update information from a firmware registry. The deployment server determines the need for a firmware update based on comparing the firmware information with the update information. Another implementation is where the deployment server assembles a commodity package based on the need for a firmware update in the firmware update framework. The commodity package includes a file to set up the environment for the firmware update and a file of information of the hardware component. Another implementation is where the commodity package includes a directory for a vendor installation tool and a directory for a firmware update image. Another implementation is where the deployment server executes a firmware update tool that extracts the commodity package from the framework and installs the firmware update. Another implementation is where the commodity package is part of a pack of commodity packages assembled by the deployment server based on the need for a firmware update. Another implementation is where the bootable disk image allows boot up of the target server through a virtual disk. Another implementation is where the target server is one of a plurality of target servers. Each of the target servers are coupled to the management and data networks. The deployment server sends the upgrade framework to upload at least one firmware image associated with one of the hardware components of the plurality of target servers through the data network.

Another disclosed example is a method of updating firmware in a server system including a deployment server and a target server. The target server includes different hardware components and a baseboard management controller. Each of the hardware components has an associated firmware image. The deployment server and the target server are connected via a management network. The deployment server and the target server are connected via a data network. A bootable disk image is sent via virtual media redirection through the management network to the target server. An upgrade framework to upload at least one firmware image associated with one of the hardware components is sent through the data network.

Another implementation of the example method is where the baseboard management controller receives the virtual media redirection through the management network. Another implementation is where the hardware components include at least one of a processor, a BIOS, a network interface card (NIC), a FPGA, or a serial attached SCSI (SAS) storage controller. Another implementation is where the method further includes obtaining firmware information for each of the hardware components of the target server. Firmware update information is obtained from a firmware registry. The need for a firmware update is determined based on the deployment server comparing the firmware information with the update information. Another implementation is where the method includes assembling a commodity package based on the need for a firmware update in the firmware update framework. The commodity package includes a file to set up the environment for the firmware update and a file of information of the hardware component. Another implementation is where the commodity package includes a directory for a vendor installation tool and a directory for a firmware update image. Another implementation is where the method includes executing a firmware update tool to extract the commodity package from the framework and install the firmware update in the target server. Another implementation is where the commodity package is part of a pack of commodity packages assembled by the deployment server based on the need for a firmware update. Another implementation is where the bootable disk image allows boot up of the target server through a virtual disk. Another implementation is where the target server is one of a plurality of target servers. Each of the target servers are coupled to the management and data networks. The deployment server sends the upgrade framework to upload at least one firmware image associated with one of the hardware components of the plurality of target servers through the data network.

The above summary is not intended to represent each embodiment or every aspect of the present disclosure. Rather, the foregoing summary merely provides an example of some of the novel aspects and features set forth herein.

The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 4 is a rear view of one of the servers in the system in FIG. 1 showing different cable connections;

FIG. 5 is a screen image of a response from an API that includes the IP address and port in the process of deploying firmware;

Figure 1:
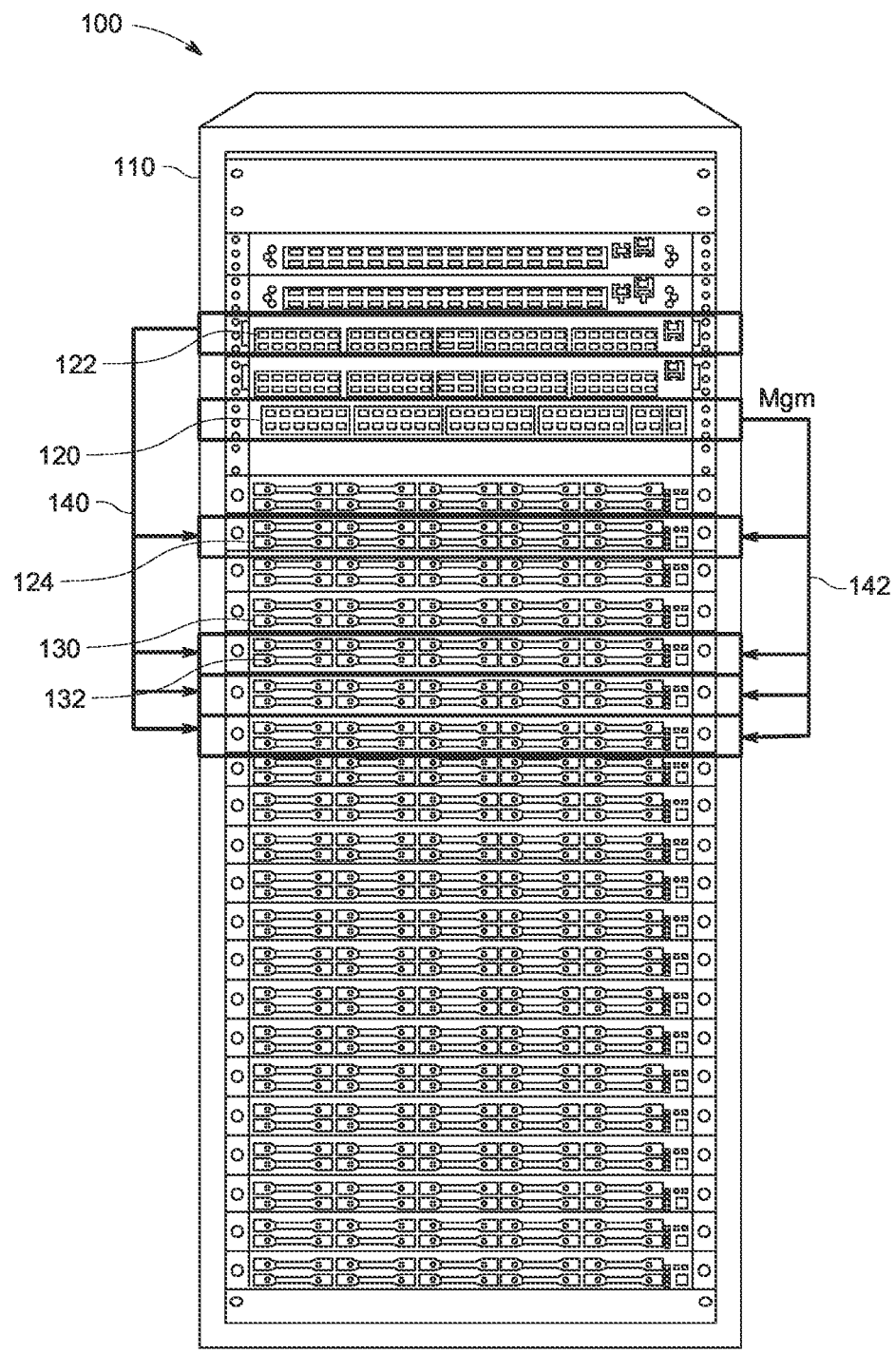
FIG. 1 is a block diagram of a rack server system that requires periodic updating of firmware images for hardware components on target servers in the rack.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a system to provide firmware updates for different hardware components of a server mounted in a rack. The system avoids the use of DHCP services thereby freeing data network capability for other operations. The system provides a uniform file of necessary tools and firmware updates in a commodity package for the hardware components of a remote server.

FIG. 1 shows a rack based server system 100 that may be housed in a physical rack 110. The rack 110 has different slots for computing devices. The rack system 100 includes a management switch 120, a series of data switches 122, and a deployment server 124. As may be shown, in this example, the switches 120 and 122 are installed in the top slots of the rack 110. The rest of the slots in the rack 110 hold servers 130. In this example, certain servers are example target servers 132. As will be explained, the target servers 132 are servers in the system 100 that require update of firmware for their hardware components. Different cables (not shown for clarity) connect the switches 120 and 122 to the servers 130.

The servers 130 each have a baseboard management controller (BMC). The BMC includes a network interface card or network interface controller that is coupled to a management network through the management switch 120 for communication to the deployment server 124 and an external administrative station. The BMC may perform hardware diagnostics of hardware components of the server. The BMC also monitors the health of hardware components of the server. The servers 130 all include hardware components that may perform functions such as storage, computing and switching. For example, the hardware components may be processors, memory devices, network interface cards, storage controllers, PCIe devices/cards and the like.

All of the servers 130 are in a data network 140 that allows communication of data between each of the servers 130. The data switches 122 provide connectivity between all of the servers 130 for the data network 140. In this example, the data network 140 is based on DHCP services provided over a LAN. Thus, each server 130 is connected to one of the data switches 122 for exchange of data over the data network 140.

A management network 142 is also deployed, where each of the servers 130 are connected to the management switch 120. Thus, each server 130 is connected to the management switch 120 via the respective BMC of the server 130. The management network 142 also includes the deployment server 124. A remote data center management station may monitor the operational conditions of all of the servers 130 through the management switch 120. As will be explained, an operator may use the deployment server 124 to manage firmware updates and assemble commodity packages for that purpose for servers such as the servers 130 in the rack. FIG. 1 thus shows the general network connectivity of the servers 130 in the rack 110 to the data network 140 and the management network 142. In this example, both networks 140 and 142 may be a local area network (LAN).

In this example, the deployment server 124 and the target servers 132 are in the same management network 142. In this example, the deployment server 124 is used to deploy images of software such as a live OS, firmware files, and update tools to the target servers 132, which can automatically run the firmware update process. The live OS is a production computer system on which all testing has been completed so that it is fully operational and ready for production work.

Figure 2:
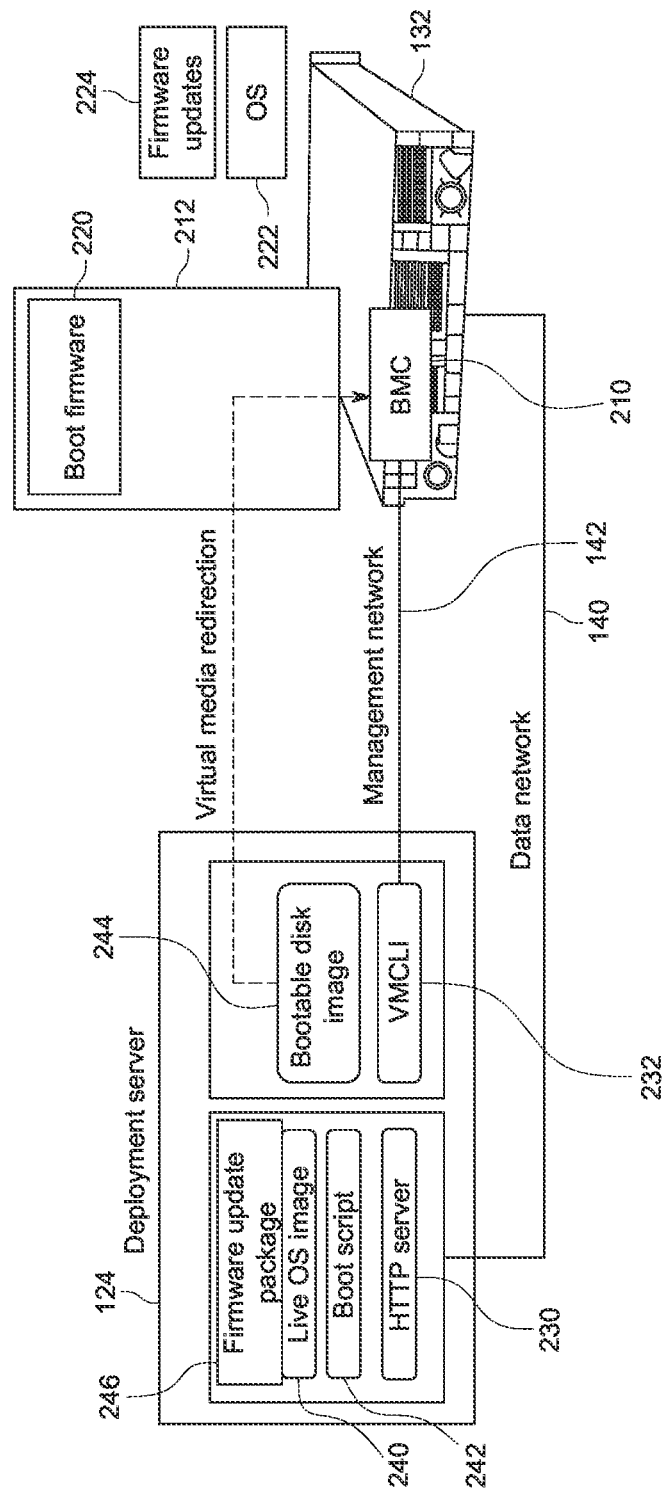
FIG. 2 is a block diagram of the process of loading boot loader and firmware images from a deployment server.

FIG. 2 is a block diagram of the basic concepts of the example firmware loading process. FIG. 2 shows the deployment server 124, the management network 142, and the data network 140. The networks 140 and 142 allow communication between the deployment server 124 with one of the target servers 132 in a rack. The target server 132 includes a BMC 210 that communicates with the management network 142. The target server 132 also includes a virtual disk 212 that is generated by the BMC 210 since a storage device mounted on the BMC 210 is accessible by the target server 132. A boot firmware 220 (e.g., ipxe.efi) is stored on the storage device of the BMC 210 and thus the boot firmware 220 may be thought as being stored on the virtual disk 212. As will be explained below, the boot firmware 220 with an IP address configuration and the file path of the boot script (iPXE script) in the deployment server 124 is deployed through the management network 142. The target server 132 also includes a live operating system 222 loaded from the deployment server 124 to manage the operation of the components of the server 132. The live operating system 222 communicates with the deployment server 124 via the data network 140. As will be explained, the live operating system 222 downloads firmware update files from the deployment server 124 through the data network 140, and therefore stores firmware updates 224 in the form of the received firmware package and supporting tools. Such updates may be distributed to the server 132 through the data network 140 without establishing an initial DHCP service.

The deployment server 124 includes an HTTP interface 230 that manages communication with the data network 140, and a virtual management (VMCLI) tool 232 that manages communication with the management network 142. The VMCI tool in this example is an AMI vendor tool used to mount virtual media from the deployment server 124 to the BMC 210 in the target server 132. The deployment server 124 stores a live OS image 240, a boot script 242, a bootable disk image 244, and a firmware package 246 in a storage device.

The bootable disk image 244 contains bootloader firmware and boot firmware (iPXE). The boot firmware 220 is stored in the bootable disk image 244. In this example, the boot firmware 220 on the virtual disk 212 can assign an IP address for a target server such as the server 132, in which the IP address can be used to access the HTTP service on a deployment server such as the deployment server 124 in the pre-boot environment.

In this example, the deployment of the live OS image 240 to the target server 132 consists of two stages. First, the bootable disk image 244 is mounted to the BMC 210 of the target server 132 using the VMCLI tool 232 of the deployment server 124. The boot firmware 220 is stored in bootable disk image 244. After the bootable disk image 244 is mounted to the BMC 210, the bootable disk image 244 is recognized as the virtual disk 212. The boot firmware 220 is stored on the virtual disk 212 as part of the bootable disk image 244 mounted to the BMC 210. The server 132 is booted from the virtual disk 212 using the boot firmware 220. In general, the BMC 210 can provide an IPMI command or Redfish API to provide the function of virtual media redirection. However, in this example the BMC 210 does not proactively provide an interface/command for virtual media redirection, and therefore the VMCLI tool 232 is necessary to remotely mount the boot firmware 220 for the target server 132. In this stage, the embedded script inside the boot firmware 220 can be used to configure the IP address for the target server 132.

Second, the boot script 242 is downloaded from the deployment server 124 via the data network 140 to the target server 132. The boot script 242 may then boot to the live OS 222 on the target server 132. In this example, a network administrator may operate the deployment server to prepare a commodity update package for the components of the target server 132. The boot script 242 includes parameters for processes of firmware updates for the live OS 222 to implement. Before the boot process, commodity packages need to be assembled by the system operator. Afterward, the assembled commodity packages can be downloaded when the firmware update proceeds in the target server 132 through the data network 140.

Figure 3:
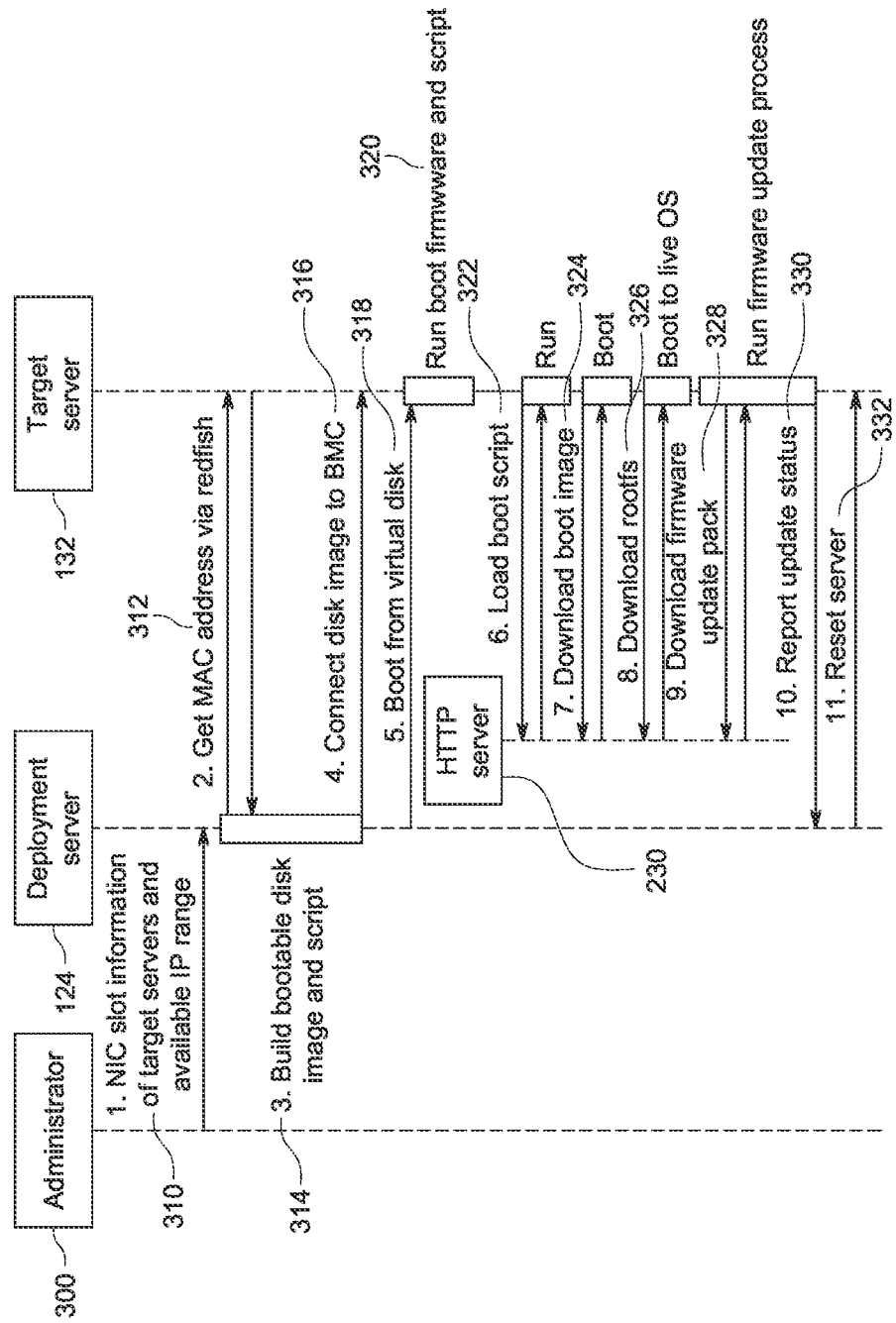
FIG. 3 is a process diagram showing the process of deploying firmware images to a target server.

FIG. 3 is a process diagram of the boot process and the deployment of firmware from the deployment server 124 to a targeted server, such as the targeted server 132 in FIG. 2. The process is administered by a datacenter administrator or operator 300.

In this example, the administrator provides the available IP address range in the network environment on the deployment server 124 (310). The available IP address range includes different available IP addresses. The application also provides the slot and port information of the network interface card (NIC) of the target servers, such as the target server 132, which is connected to a data switch such as the data switch 122 in FIG. 1. The deployment server 124 can adopt the received slot and port information to find the MAC address of the target server 132 via a Redfish API executed by the BMC on the target server 132 (312). Once the MAC address of the target server 132 is received by the management station 300, the deployment server 124 builds a bootable disk image such as the bootable disk image 244 and a boot script such as the boot script 242 in FIG. 2 with IP address data (314). For example, a Linux command may create an empty disk image. The boot script 242 is an iPXE script that can assign the location of the kernel and initrd (initial RAM disk) files in the deployment server 124. The creation of the bootable disk image 244 includes providing extensible firmware interface (EFI) boot files and a bootloader routine. In this example, the bootloader is the GNU Grand Unified Bootloader (GRUB).

Network boot firmware script, such as an iPXE script, is generated to find the NIC whose MAC address matches with the address found by the deployment server 124 from the Redfish API run by the target server 132. One of the available IP addresses provided by the administrator 300 is then designated for the target server 132 to access the HTTP server 230 (and deployment server 124) through the data network 140. The network boot firmware such as iPXE firmware (e.g., ipxe.efi) is built with the generated network boot firmware script. The boot firmware is put in the bootable disk image 244. The bootloader (GRUB) is configured to chain-load the boot firmware (ipxe.efi).

The created bootable disk image is then connected to the BMC 210 of the target server 132 and stored in the virtual disk 212 in FIG. 2 (316). The boot device of the target server 132 is set to the virtual disk 212. The target server 132 is then powered on.

The boot-up is performed by the boot firmware 220 (in FIG. 2) stored on the virtual disk 212 (318). In this example the network boot firmware (iPXE) of the boot firmware 220 on the virtual disk 212 starts up and configures the IP address for a specific NIC port for the target server 132 (320). The network boot firmware (iPXE) downloads a boot script (322), such as the boot script 242 in FIG. 2, from the HTTP server 230, and runs the boot script 242.

The kernel and initial RAM file system (initramfs) is downloaded from the HTTP server 220 and the boot process is initiated (324). The root file system (rootfs) is downloaded, and the boot initiates the live OS 222 (326). The firmware update process is then run by downloading the firmware update package 246 from the HTTP server 220 via the data network 140 (328). The update status is reported to the deployment server 124 from the firmware update package executed by the target server 132 (330). The deployment server 124 then causes the target server 132 to be reset in order to initiate the updated firmware (332).

FIG. 4 is a back view of an example target server 132. In this example, a cable may be connected to a port such as a riser 1A slot 402 in the server 132. Other ports such as riser slots 404 and 406 may also be present, as well as an OCP slot 408. The cable connection is known to the administrative application on the management station 300 in FIG. 3. Thus, the NIC slot information of the target server 132 may be provided with one of the available IP addresses.

FIG. 5 is a screen image 500 of a response 510 from a Redfish API executed by the BMC 210, as shown in step 312 in FIG. 3. The response 510 in the screen image 500 includes the MAC address (MACAddress) 512 and slot information (SlotNumber) 514 corresponding to the identified cable connection of the target server 132 in FIG. 3, such as the port 402 in FIG. 4 in this example.

In this example, both the management network 142 and the data network 140 are accessible. The deployment server 124 will send the bootloader through the remote virtual media interface VMCLI tool 232 in FIG. 2 to handle the bootable disk image retrieval process using the management network 142. The deployment server 124 will then load the firmware upgrade framework through the data network 142 after the bootloader is sent. In this manner, administrators can avoid establishing a DHCP service for the data network 140 for loading firmware packages. If either the data network 140 or the management network 142 is not available, the deployment server 124 will not be able to load the firmware upgrade framework directly through the data network 140.

Figure 6A:
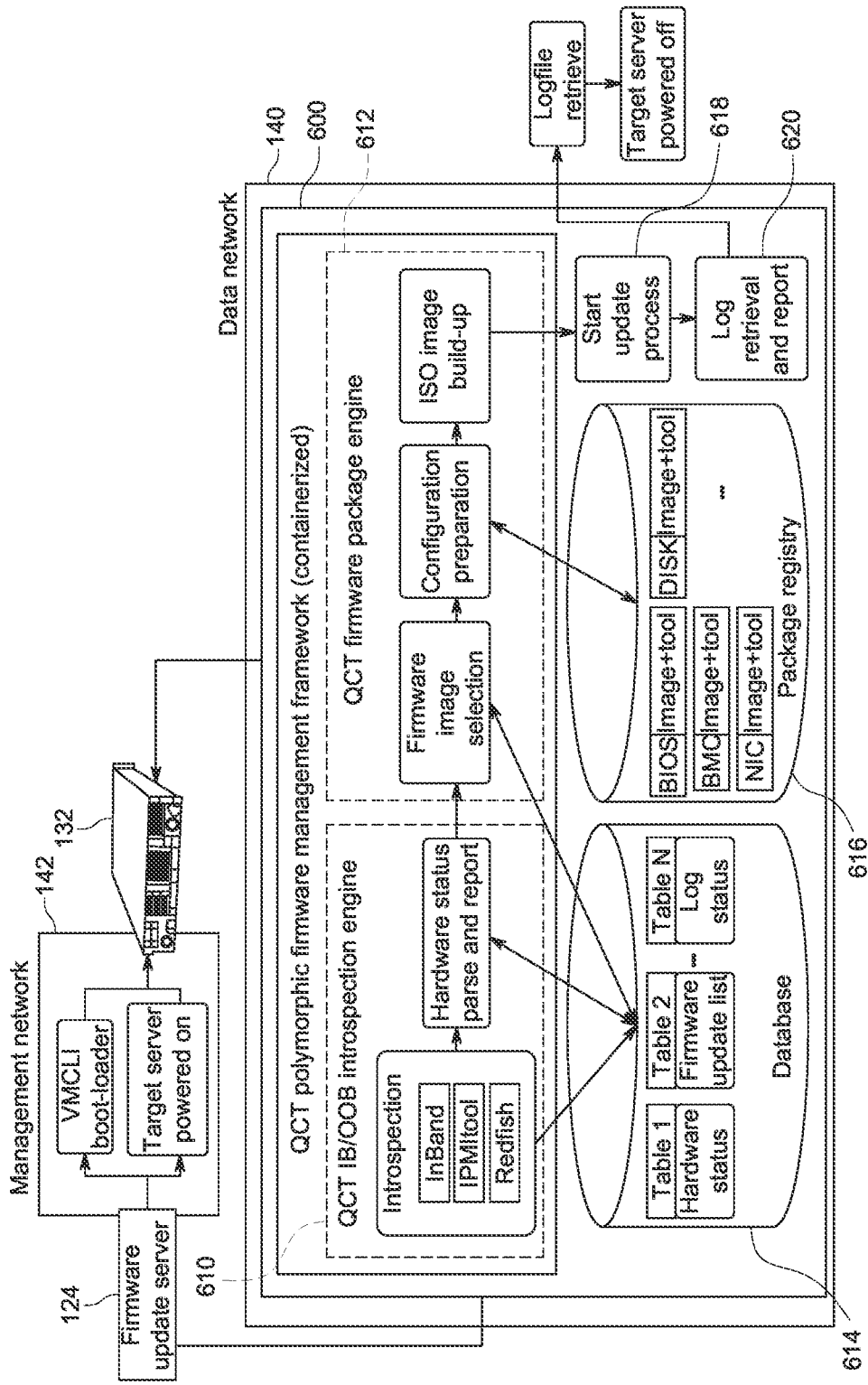
FIG. 6A is a block diagram of the process of using an update package routine for a firmware update.

FIG. 6A is a process diagram that shows the different firmware update packages that are transmitted by the data network 140 and the management network 142 between the deployment server 124 and the target server 132 for the firmware image update process. As explained above, the boot loader components such as the bootable disk image 244 in FIG. 2 are sent through the management network 142. The scripts allow the server 132 to be powered on from the management network 142.

As previously explained, a firmware management framework 600 is implemented in the deployment server 124. The firmware management framework 600 includes an introspection engine 610 and a firmware package engine 612 executed by the deployment server 124. The introspection engine 610 performs inspection of the target server 132 through an inband agent, an IPMItool, and through a Redfish API to obtain hardware information from the hardware on the server 132. The introspection engine 610 accesses a database 614 that contains tables that include a table of the hardware status of all the components on the target server 132, a table of firmware updates, and a table of log status. The introspection engine 610 compares the hardware status of the hardware components with the table of firmware updates to determine the hardware status and which components require a firmware update.

The firmware package engine 612 receives the report of the hardware status and which components require a firmware update from the introspection engine 610. The firmware package engine 612 prepares the configuration of the update package by accessing a registry 616 of available images and tools for firmware upgrades for each of the applicable hardware components. For example, the registry 616 may include images and tools for hardware components such as a BIOS, a BMC, a NIC, and a storage controller. The firmware package engine 612 then builds the firmware package before the process in FIG. 2 is performed. The update process 618 is then initiated by the firmware management framework 600 in the deployment server 124. A log 620 is created to report the update process to the deployment server 124 detailing the upgrades. The logfile is retrieved through the data network 140. Once the upgrades are complete, the target server 132 is powered off.

Figure 6B:
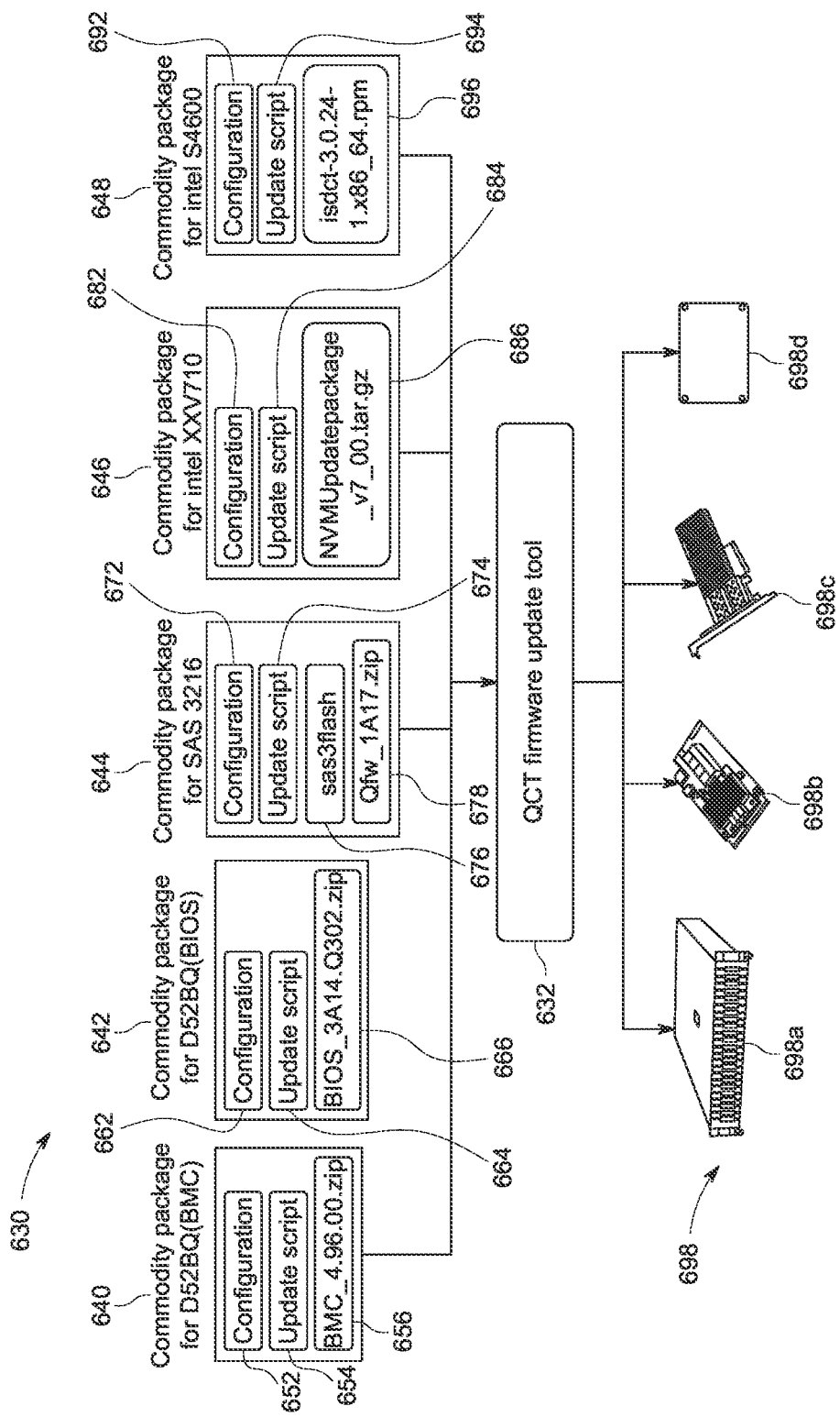
FIG. 6B is a block diagram of the firmware update structure in an example commodity package.

FIG. 6B shows a unified structure 630 for the example firmware update process. All required tools, firmware files, and configuration of each commodity hardware component for a server such as the target server 132 in FIG. 1 are wrapped into a "commodity package." A firmware update tool 632 can be used to process the commodity package by extracting the packages and running the appropriate update script.

In this example, a commodity package 640 is provided for a BMC of a target server model; a commodity package 642 is provided for the BIOS of a server; a commodity package 644 is provided for a serial attached SCSI (SAS) storage device controller; a commodity package 646 is provided for an Intel network controller; and a commodity package 648 is provided for a solid state drive (SSD). Other packages may be provided for other types of hardware components such as an FPGA, a disk controller, or a network interface card (NIC) on the target server 132 using the principles described herein.

In this example, the commodity package 640 includes a configuration file 652, an update script 654, and a zip file 656 that includes tools and firmware files for the BMC. In this example, the commodity package 642 includes a configuration file 662, an update script 664, and a zip file 666. The zip file 666 includes tools and firmware files for the BIOS for a specific server type. In this example, the commodity package 644 includes a configuration file 672, an update script 674, a flash file 676, and a zip file 678. The flash file 676 in this example is a vendor supplied tool for firmware updates. The zip file 678 includes tools and firmware files for the SAS controller. In this example, the commodity package 646 includes a configuration file 682, an update script 684, and a zip file 686. The zip file 686 includes tools and firmware files for the network controller. In this example, the zip file 686 includes an Intel XXV710 update tool. In this example, the commodity package 648 includes a configuration file 692, an update script 694, and a zip file 696 that includes tools and firmware files for the solid state drive. In this example, zip file 696 includes an Intel SSD update tool. In this example, the firmware update tool 632 deploys the appropriate updates for different hardware 698 in the target server 132. In this example, the hardware 698 includes a server 698a for the BIOS and BMC firmware updates, a SAS controller 698b such as a SAS 3216, a network controller 698c, such as an Intel XXV710, and a SSD 698d such as an Intel S4600. Of course other firmware update commodity packages may be provided for other components such as FPGAs, NICs, GPUs and the like.

In this example, the deployment server 124 runs a firmware upgrade image packager routine through the management framework 600 in FIG. 6A as part of the update tool in FIG. 6B. The routine provides a hardware component identification process through the introspection engine 610, a firmware upgrade tool identification process through the firmware upgrade engine 612, and an upgrade process scripting mechanism.

In the hardware component identification process, the introspection engine 610 runs an automated process to scan each of the hardware components in the target server 132, and uses corresponding tools to identify its detailed specification and information. Examples of tools may include an inband agent, an open source tool such as an IPMI tool, and a Redfish API to obtain hardware information. As shown in FIG. 6A, the firmware package engine 612, according to each of the SKUs the hardware component, generates a commodity package (upgrade image) dynamically. In the upgrade process, the routine will run the update process for each commodity package automatically.

The entity with pre-defined rules in each of the commodity packages is flexible since the firmware update tool 612 only processes the predefined file rather than implementing the script in detail. Thus, the detailed update process can be implemented in the respective commodity package for the hardware component in the target server 132.

In this example, the pre-defined rules of each commodity package include certain files and directories. The files include five files named pre_update.sh, post_update.sh, info.json, env.json, and command.json files in this example. The pre_update.sh file is used to set up the environment before updating the firmware. The environment includes the required tools or packages to be installed, the extracting firmware package, and the file path for exportation. For example, the official firmware image of NVMUpdatePackage_v7_00.tar.gz is compressed in the zip file 686 of the commodity package 646. The pre_update.sh file may extract the NVMUpdatePackage_v7_00.tar.gz to a specific folder and write the path to the env.json file for further use. The post_update.sh file is used to run a verification or clean process, such as removing installed tool files and temporary files.

The info.json file is used to describe the device information for the component matching the commodity package. The attributes depend on the device type. For example, the information of a Peripheral Component Interconnect (PCI) device may be described as

```
{
  "vid": "8086",
  "did": "158b",
  "subsystem_vendor_id": "8086",
  "subsystem_id": "0000"
}
```

The "vid" is the vendor ID, the "did" is the device ID, the "vendor id" is 8086, and the "subsystem id" is 0000.

The env.json file is used to store the environment variables, which are generated at runtime. For example, the value of key "dir" indicates the directory path of the vendor tool after extracting the vendor package.

```
{
  "dir": "tool/700Series/Linux_x64"
}
```

Thus, in this example the directory path is tool/700Series/Linux_x64. Other environmental variables may include the location of the configuration file.

In this example, there are three directories in each commodity package including a /script, a /tool, and a /firmware directories. The /script directory is a directory used to store an update script file in which the file is used to execute the vendor tool in order to run the main update process. The /tool directory is a directory used to store the vendor tools relating to the hardware component associated with the commodity package. The /firmware directory is a directory used to store the firmware package. The directories are stored in the registry with the files in the deployment server 124.

The command.json file is used to define the command pattern. The attributes of the command.json file are listed as follows:
 exec: The relative path of update script.
 args: Used to define the argument pattern. The string starting with "$" indicates a variable and the following string is the name of key in info.json or env.json. For example, the use of nvmupdate.sh is "nvmupdate.sh -D <directory> -v <vid> -d <did>", which can be represented as:

```
{
    "exec": "script/nvmupdate.sh",
    "args": "-D $dir -v $vid -d $did"
}
```

Figure 7:
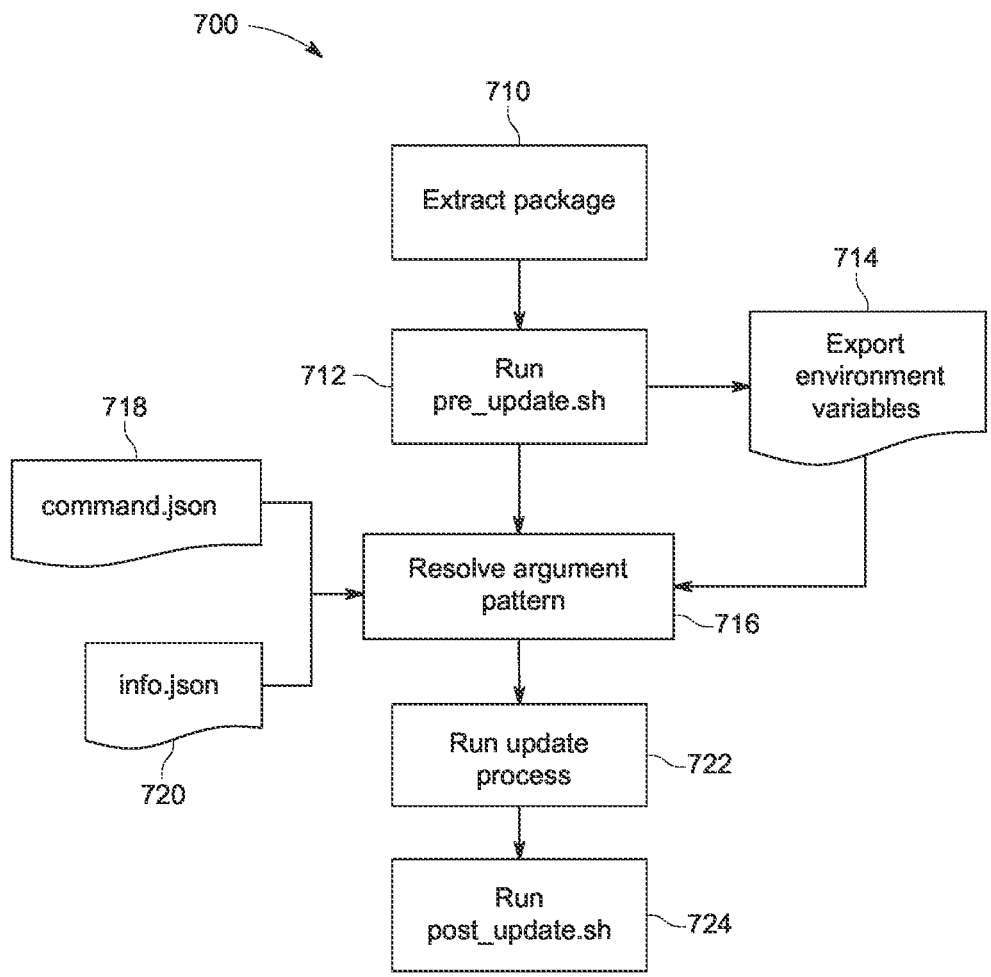
FIG. 7 is a flow diagram of a routine of an example firmware update tool.

FIG. 7 shows a flow diagram of an implementation routine 700 of the example firmware update tool 632 in FIG. 6B. The flow diagram in FIG. 7 is representative of example machine readable instructions for the process of installing an assembled commodity firmware package for firmware updates for a hardware component. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine 700 first extracts the files and directories of the commodity package relating to the target hardware component that requires a firmware update (710). The routine then runs the pre_update.sh file to set up the environment for the update (712). The environment set up may include installing the required tools or packages, extracting the firmware from the commodity package, and exporting the file path. The script can then export the required variables such as the directory paths from the env.json file (714). The routine then resolves the argument pattern by parsing the command.json file (716). The resolution of the argument pattern takes the exported required variables from env.json file (714). The argument resolution also accepts inputs from the command.json file to define the command pattern (716) and the info.json file for attributes of the hardware components (718). The argument resolution parses all variables of the attribute arg in the command.json file. The argument parser will replace $dir in command.json with the value of "dir" in env.json, and $vid and $did in command.json with the value of "vid" and "did" in info.json. For example, the final execution command will be "script/nvmupdate.sh -D tool/700Series/Linux_x64 -v 8086 -d 158b."

The routine then runs the update process (722) by running the command as resolved by the argument pattern resolution (716). The routine then runs the post_update.sh file to verify the update and remove and installed tools or temporary files (724).

Figure 8:
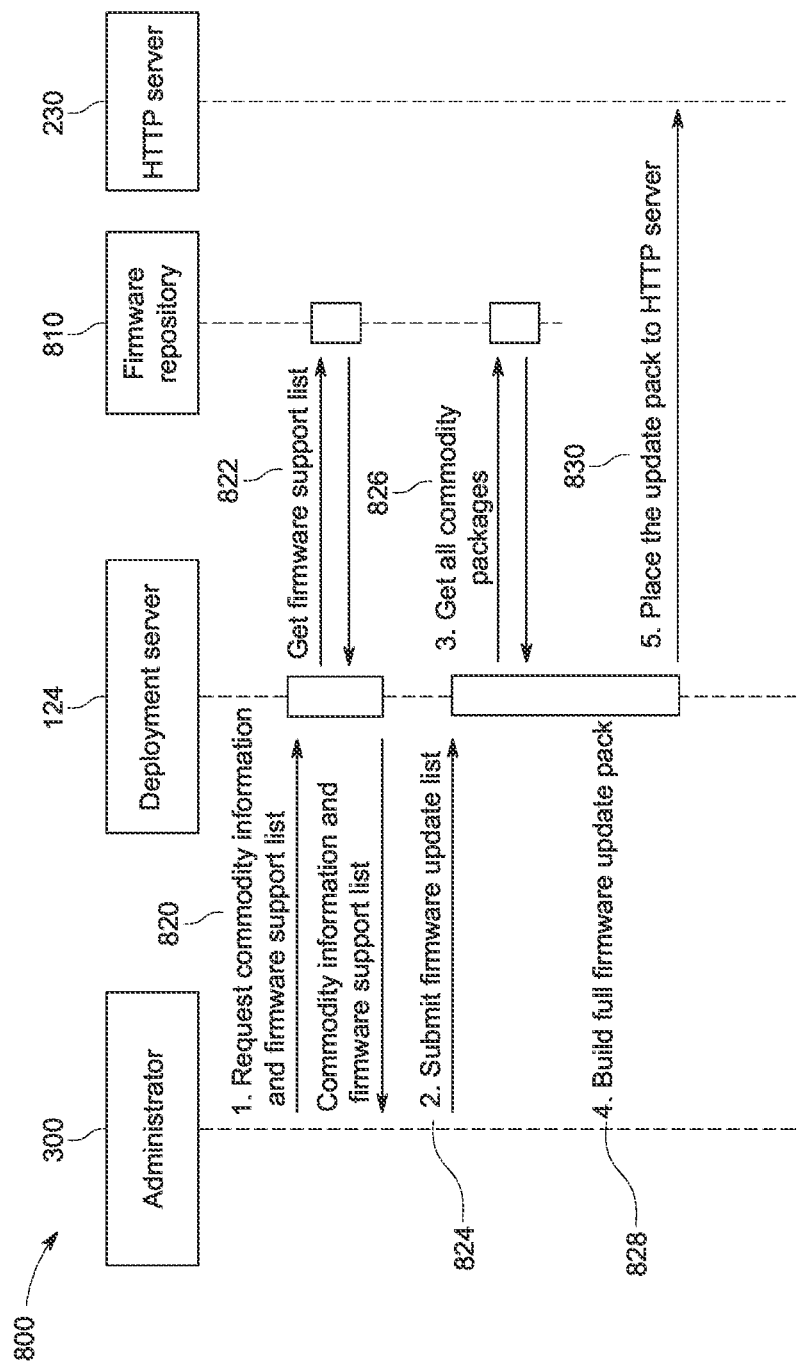
FIG. 8 is a process flow diagram of a routine to update firmware through provision of an update package of firmware commodity packages.

FIG. 8 is a process flow 800 to show the example firmware process update (328 in FIG. 3) between the management station 300, the deployment server 124, the HTTP server 220 and a firmware repository 810. In this example, the firmware repository 810 resides in the deployment server 124. In this example, the firmware repository resides in the package registry of the deployment server 124. First, the management station 300 requests all commodity information and a firmware support list from the deployment server 124 in FIG. 2 and sends them to the management station 300 (820). The firmware support list shows the available versions for current commodities of a target server such as the target server 132. The deployment server 124 obtains firmware information from the firmware repository 810 (822).

The deployment server 124 runs the update framework 600 in FIG. 6A and submits a firmware update list, including specific commodities and the expected firmware version for all hardware components of the target server (824). According to the update list, the deployment server 124 can gather the commodity packages from the firmware repository 810 (826). The deployment server 124 builds a firmware update pack (828). The firmware update pack includes the firmware update tool and the commodity packages, such as those shown in FIG. 6B obtained by the deployment server 124. The firmware update pack is delivered to the HTTP server 222 in FIG. 2 (830). The different commodity packages of the delivered update pack can be applied to deploy to the target servers using the image loading process over the data network 140.

Figure 9:
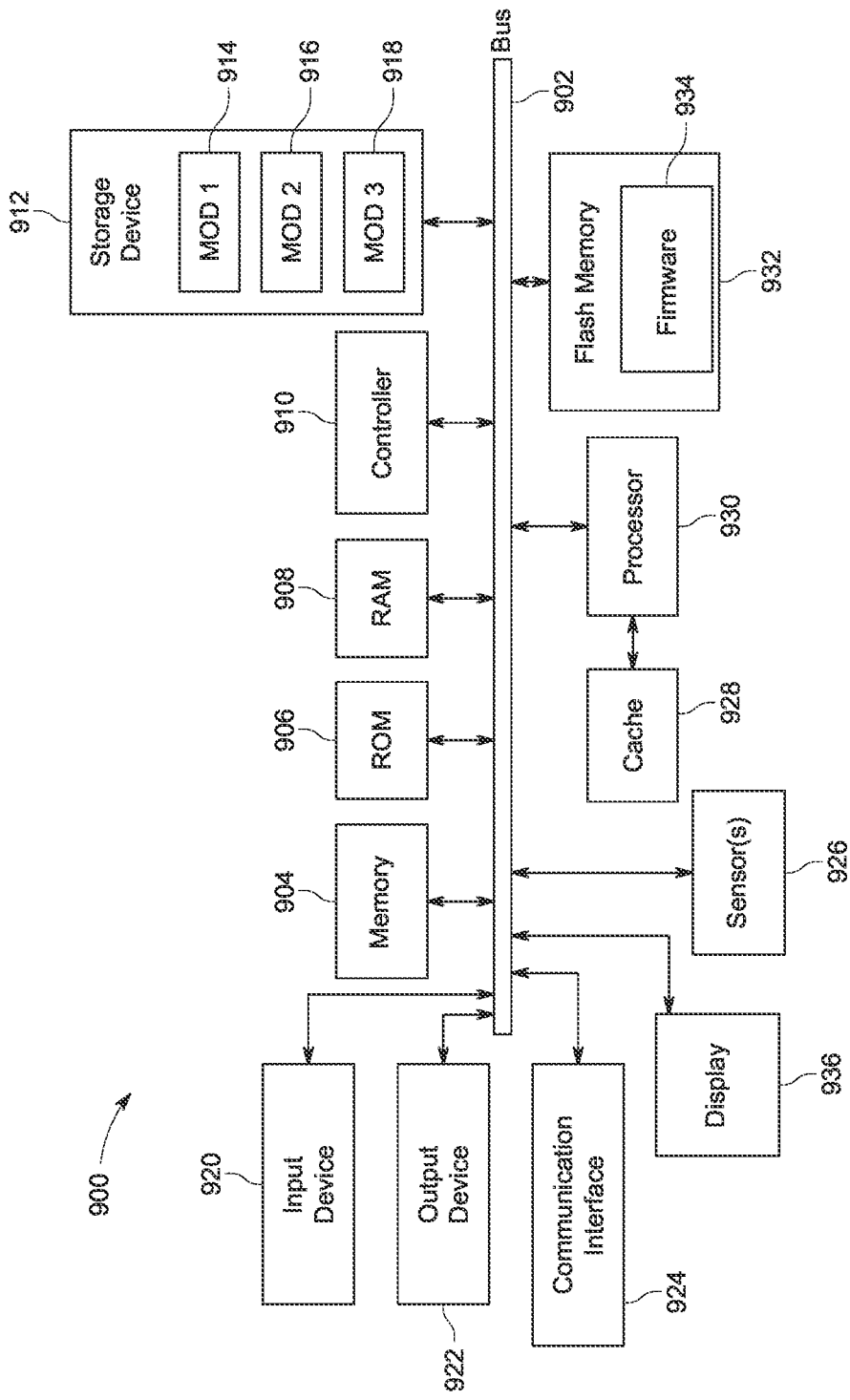
FIGS. 9-10 are block diagrams of computer systems to implement the processes described herein.

FIG. 9 illustrates an example computing system 900, in which the components of the computing system are in electrical communication with each other using a bus 902. The system 900 includes a processing unit (CPU or processor) 930; and a system bus 902 that couples various system components, including the system memory 904 (e.g., read only memory (ROM) 906 and random access memory (RAM) 908), to the processor 930. The system 900 can include a cache of high-speed memory connected directly with, in close proximity to, or integrated as part of the processor 930. The system 900 can copy data from the memory 904 and/or the storage device 912 to the cache 928 for quick access by the processor 930. In this way, the cache can provide a performance boost for processor 930 while waiting for data. These and other modules can control or be configured to control the processor 930 to perform various actions. Other system memory 904 may be available for use as well. The memory 904 can include multiple different types of memory with different performance characteristics. The processor 930 can include any general purpose processor and a hardware module or software module, such as module 1 914, module 2 916, and module 3 918 embedded in storage device 912. The hardware module or software module is configured to control the processor 930, as well as a special-purpose processor where software instructions are incorporated into the actual processor design. The processor 930 may essentially be a completely self-contained computing system that contains multiple cores or processors, a bus, memory controller, cache, etc. A multi-core processor may be symmetric or asymmetric.

To enable user interaction with the computing device 900, an input device 920 is provided as an input mechanism. The input device 920 can comprise a microphone for speech, a touch-sensitive screen for gesture or graphical input, keyboard, mouse, motion input, and so forth. In some instances, multimodal systems can enable a user to provide multiple types of input to communicate with the system 900. In this example, an output device 922 is also provided. The communications interface 924 can govern and manage the user input and system output.

Storage device 912 can be a non-volatile memory to store data that is accessible by a computer. The storage device 912 can be magnetic cassettes, flash memory cards, solid state memory devices, digital versatile disks, cartridges, random access memories (RAMs) 908, read only memory (ROM) 906, and hybrids thereof.

The controller 910 can be a specialized microcontroller or processor on the system 900, such as a BMC (baseboard management controller). In some cases, the controller 910 can be part of an Intelligent Platform Management Interface (IPMI). Moreover, in some cases, the controller 910 can be embedded on a motherboard or main circuit board of the system 900. The controller 910 can manage the interface between system management software and platform hardware. The controller 910 can also communicate with various system devices and components (internal and/or external), such as controllers or peripheral components, as further described below.

The controller 910 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 910 to initiate or conduct specific hardware recovery procedures or operations, as further described below.

The controller 910 can also include a system event log controller and/or storage for managing and maintaining events, alerts, and notifications received by the controller 910. For example, the controller 910 or a system event log controller can receive alerts or notifications from one or more devices and components, and maintain the alerts or notifications in a system event log storage component.

Flash memory 932 can be an electronic non-volatile computer storage medium or chip that can be used by the system 900 for storage and/or data transfer. The flash memory 932 can be electrically erased and/or reprogrammed. Flash memory 932 can include EPROM (erasable programmable read-only memory), EEPROM (electrically erasable programmable read-only memory), ROM, NVRAM, or CMOS (complementary metal-oxide semiconductor), for example. The flash memory 932 can store the firmware 934 executed by the system 900 when the system 900 is first powered on, along with a set of configurations specified for the firmware 934. The flash memory 932 can also store configurations used by the firmware 934.

The firmware 934 can include a Basic Input/Output System or equivalents, such as an EFI (Extensible Firmware Interface) or UEFI (Unified Extensible Firmware Interface). The firmware 934 can be loaded and executed as a sequence program each time the system 900 is started. The firmware 934 can recognize, initialize, and test hardware present in the system 900 based on the set of configurations. The firmware 934 can perform a self-test, such as a POST (Power-On-Self-Test), on the system 900. This self-test can test the functionality of various hardware components such as hard disk drives, optical reading devices, cooling devices, memory modules, expansion cards, and the like. The firmware 934 can address and allocate an area in the memory 904, ROM 906, RAM 908, and/or storage device 912, to store an operating system (OS). The firmware 934 can load a boot loader and/or OS, and give control of the system 900 to the OS.

The firmware 934 of the system 900 can include a firmware configuration that defines how the firmware 934 controls various hardware components in the system 900. The firmware configuration can determine the order in which the various hardware components in the system 900 are started. The firmware 934 can provide an interface, such as an UEFI, that allows a variety of different parameters to be set, which can be different from parameters in a firmware default configuration. For example, a user (e.g., an administrator) can use the firmware 934 to specify clock and bus speeds; define what peripherals are attached to the system 900; set monitoring of health (e.g., fan speeds and CPU temperature limits); and/or provide a variety of other parameters that affect overall performance and power usage of the system 900. While firmware 934 is illustrated as being stored in the flash memory 932, one of ordinary skill in the art will readily recognize that the firmware 934 can be stored in other memory components, such as memory 904 or ROM 906.

System 900 can include one or more sensors 926. The one or more sensors 926 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 926 can communicate with the processor, cache 928, flash memory 932, communications interface 924, memory 904, ROM 906, RAM 908, controller 910, and storage device 912, via the bus 902, for example. The one or more sensors 926 can also communicate with other components in the system via one or more different means, such as inter-integrated circuit (I2C), general purpose output (GPO), and the like. Different types of sensors (e.g., sensors 926) on the system 900 can also report to the controller 910 on parameters, such as cooling fan speeds, power status, operating system (OS) status, hardware status, and so forth. A display 936 may be used by the system 900 to provide graphics related to the applications that are executed by the controller 910.

Figure 10:
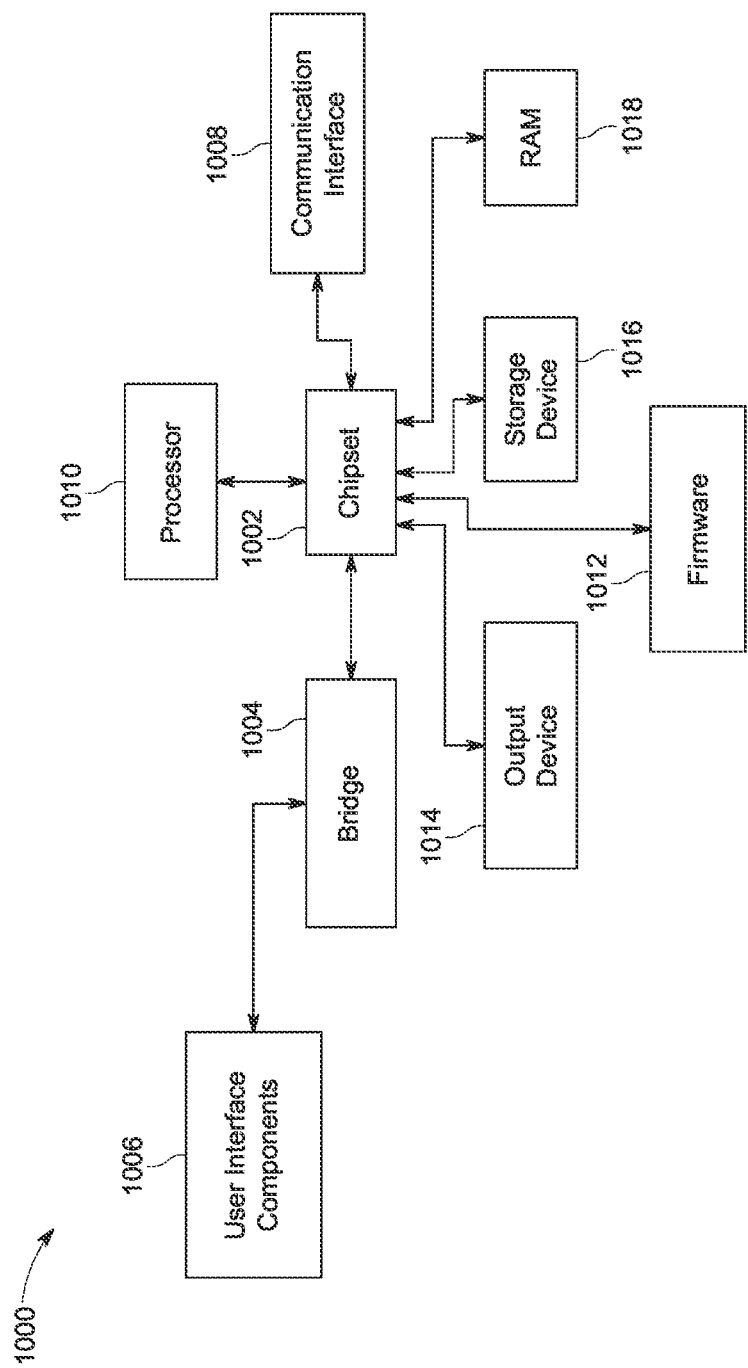

FIG. 10 illustrates an example computer system 1000 having a chipset architecture that can be used in executing the described method(s) or operations, and generating and displaying a graphical user interface (GUI). Computer system 1000 can include computer hardware, software, and firmware that can be used to implement the disclosed technology. System 1000 can include a processor 1010, representative of a variety of physically and/or logically distinct resources capable of executing software, firmware, and hardware configured to perform identified computations. Processor 1010 can communicate with a chipset 1002 that can control input to and output from processor 1010. In this example, chipset 1002 outputs information to output device 1014, such as a display, and can read and write information to storage device 1016. The storage device 1016 can include magnetic media, and solid state media, for example. Chipset 1002 can also read data from and write data to RAM 1018. A bridge 1004 for interfacing with a variety of user interface components 1006, can be provided for interfacing with chipset 1002. User interface components 1006 can include a keyboard, a microphone, touch detection and processing circuitry, and a pointing device, such as a mouse.

Chipset 1002 can also interface with one or more communication interfaces 1008 that can have different physical interfaces. Such communication interfaces can include interfaces for wired and wireless local area networks, for broadband wireless networks, and for personal area networks. Further, the machine can receive inputs from a user via user interface components 1006, and execute appropriate functions, such as browsing functions by interpreting these inputs using processor 1010.

Moreover, chipset 1002 can also communicate with firmware 1012, which can be executed by the computer system 1000 when powering on. The firmware 1012 can recognize, initialize, and test hardware present in the computer system 1000 based on a set of firmware configurations. The firmware 1012 can perform a self-test, such as a POST, on the system 1000. The self-test can test the functionality of the various hardware components 1002-1018. The firmware 1012 can address and allocate an area in the memory 1018 to store an OS. The firmware 1012 can load a boot loader and/or OS, and give control of the system 1000 to the OS. In some cases, the firmware 1012 can communicate with the hardware components 1002-1010 and 1014-1018. Here, the firmware 1012 can communicate with the hardware components 1002-1010 and 1014-1018 through the chipset 1002, and/or through one or more other components. In some cases, the firmware 1012 can communicate directly with the hardware components 1002-1010 and 1014-1018.

It can be appreciated that example systems 900 (in FIG. 9) and 1000 can have more than one processor (e.g., 930, 1010), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A server system comprising:
    a deployment server executing an update framework to provide firmware to target servers;
    a target server including a plurality of different hardware components and a baseboard management controller, each of the hardware components having an associated firmware image;
    a management network connecting the deployment server and the target server; and
    a data network connecting the deployment server and the target server, wherein the data network is distinct from the management network, and wherein the deployment server is operable to send a bootable disk image via virtual media redirection through the management network, and send the update framework to upload at least one firmware image associated with one of the hardware components through the data network to the target server.

2. The system of claim 1, wherein the baseboard management controller receives the virtual media redirection through the management network.

3. The system of claim 1, wherein the hardware components include at least one of a processor, a network interface card (NIC), a field programmable gate array (FPGA), a serial attached SCSI (SAS) storage controller, a network controller, or a memory device.

4. The system of claim 1, wherein the deployment server includes firmware information for each of the hardware components of the target server, and wherein the deployment server obtains firmware update information from a firmware registry, the deployment server operable to determine the need for a firmware update based on comparing the firmware information with the firmware update information.

5. The system of claim 4, wherein the deployment server assembles a commodity package based on the need for a firmware update in the update framework, wherein the commodity package includes a file to set up the environment for the firmware update and a file of information of the hardware component.

6. The system of claim 5, wherein the commodity package includes a directory for a vendor installation tool and a directory for a firmware update image.

7. The system of claim 5, wherein the deployment server executes a firmware update tool that is operable to extract the commodity package from the update framework and install the firmware update.

8. The system of claim 5, wherein the commodity package is part of a pack of commodity packages assembled by the deployment server based on the need for a firmware update.

9. The system of claim 1, wherein the bootable disk image allows boot up of the target server through a virtual disk.

10. The system of claim 1, wherein the target server is one of a plurality of target servers, wherein each of the target servers are coupled to the management and data networks, and wherein the deployment server sends the update framework to upload at least one firmware image associated with one of the hardware components of the plurality of target servers through the data network.

11. A method of updating firmware in a server system including a deployment server and a target server, the target server including a plurality of different hardware components and a baseboard management controller, each of the hardware components having an associated firmware image, the method comprising:
    connecting the deployment server and the target server via a management network;
    connecting the deployment server and the target server via a data network, wherein the data network is distinct from the management network;
    sending a bootable disk image via virtual media redirection through the management network to the target server; and
    sending the upgrade framework to upload at least one firmware image associated with one of the hardware components through the data network.

12. The method of claim 11, wherein the baseboard management controller receives the virtual media redirection through the management network.

13. The method of claim 11, wherein the hardware components include at least one of a processor, a network interface card (NIC), a field programmable gate array (FPGA), or a serial attached SCSI (SAS) storage controller.

14. The method of claim 11, further comprising:
    obtaining firmware information for each of the hardware components of the target server;
    obtaining firmware update information from a firmware registry; and
    determining the need for a firmware update based on the deployment server comparing the firmware information with the firmware update information.

15. The method of claim 14, further comprising assembling a commodity package based on the need for a firmware update in the update framework, wherein the commodity package includes a file to set up the environment for the firmware update and a file of information of the hardware component.

16. The method of claim 15, wherein the commodity package includes a directory for a vendor installation tool and a directory for a firmware update image.

17. The method of claim 15, further comprising executing a firmware update tool to extract the commodity package from the update framework and install the firmware update in the target server.

18. The method of claim 15, wherein the commodity package is part of a pack of commodity packages assembled by the deployment server based on the need for a firmware update.

19. The method of claim 11, wherein the bootable disk image allows boot up of the target server through a virtual disk.

20. The method of claim 11, wherein the target server is one of a plurality of target servers, wherein each of the target servers are coupled to the management and data networks, and wherein the deployment server sends the update framework to upload at least one firmware image associated with one of the hardware components of the plurality of target servers through the data network.

21. The system of claim 1, wherein the update framework is sent to the server through the data network without establishing a dynamic host configuration protocol (DHCP) service for the data network after the bootable disk image is sent through the management network.

* * * * *